US011321663B2

(12) United States Patent
Bühlmeyer et al.

(10) Patent No.: US 11,321,663 B2
(45) Date of Patent: May 3, 2022

(54) APPARATUS FOR ATTACHING TO A SHELF DEVICE OF A GOODS RACK AND SYSTEM HAVING SUCH AN APPARATUS

(71) Applicant: Rehau AG + Co., Rehau (DE)

(72) Inventors: Christian Bühlmeyer, Vienna (AT); Steven Schmidt, Döhlau (DE); Peter Michels, Hof (DE); Santiago Pardos, Selb (DE); Ansgar Niehoff, Rehau (DE); Stefan Eibl, Hof (DE); Jörg Goldstein, Hof (DE); Holger Fritzlar, Cologne (DE)

(73) Assignee: Rehau AG + Co., Rehau (DE)

( * ) Notice: Subject to any disclaimer, the term of this patent is extended or adjusted under 35 U.S.C. 154(b) by 69 days.

(21) Appl. No.: 16/467,964

(22) PCT Filed: Dec. 19, 2017

(86) PCT No.: PCT/EP2017/083462
§ 371 (c)(1),
(2) Date: Sep. 29, 2019

(87) PCT Pub. No.: WO2018/114899
PCT Pub. Date: Jun. 28, 2018

(65) Prior Publication Data
US 2020/0057983 A1 Feb. 20, 2020

(30) Foreign Application Priority Data
Dec. 20, 2016 (DE) .......................... 102016124964.5

(51) Int. Cl.
*G06Q 10/08* (2012.01)
*A47F 5/00* (2006.01)

(52) U.S. Cl.
CPC ......... *G06Q 10/087* (2013.01); *A47F 5/0018* (2013.01); *A47F 5/0068* (2013.01)

(58) Field of Classification Search
CPC .... G06Q 10/087; A47F 5/0018; A47F 5/0068
See application file for complete search history.

(56) References Cited

U.S. PATENT DOCUMENTS

| 3,295,093 A | 12/1966 | Manfred et al. |
| 6,231,205 B1 | 5/2001 | Slesinger et al. |
| 8,915,609 B1 | 12/2014 | Shah et al. |

(Continued)

FOREIGN PATENT DOCUMENTS

| DE | 20221024 | 2/2005 |
| DE | 202015105014 | 9/2015 |

(Continued)

OTHER PUBLICATIONS

Translation of Abstract of FR 2671471.
(Continued)

*Primary Examiner* — Stanton L Krycinski
(74) *Attorney, Agent, or Firm* — Aird & McBurney LP

(57) ABSTRACT

The invention relates to an apparatus (200) comprising an elongate main body (202) made of a plastic material for attaching to a shelf device (70) of a goods rack (236) and comprising at least one signaling apparatus (204), which is attached to the main body (202) and which is provided for signaling a hand motion toward the shelf device (70) and/or for signaling a hand motion away from the shelf device (70).

3 Claims, 9 Drawing Sheets

(56) References Cited

U.S. PATENT DOCUMENTS

Figure 1:
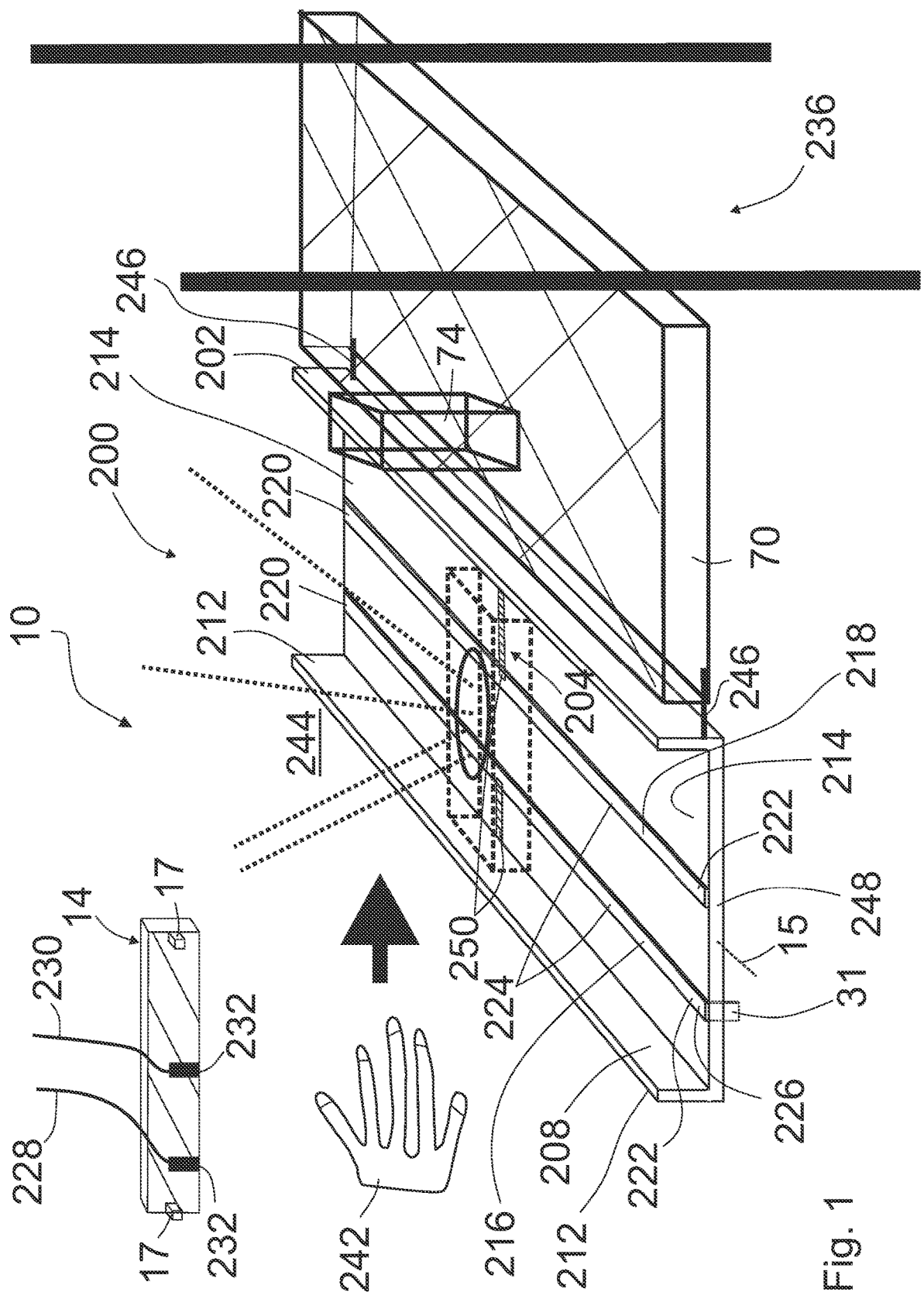

| | | | | |
|---|---|---|---|---|
| 9,224,124 | B2* | 12/2015 | Rahim | G07F 17/0092 |
| 9,349,238 | B2* | 5/2016 | Tkachenko | G06Q 20/3278 |
| 9,727,838 | B2* | 8/2017 | Campbell | G06Q 10/087 |
| 9,911,290 | B1* | 3/2018 | Zalewski | G06Q 20/12 |
| 10,012,750 | B2* | 7/2018 | Draeger | G01V 3/104 |
| 10,121,034 | B1* | 11/2018 | Bathurst | G06Q 10/087 |
| 10,262,293 | B1* | 4/2019 | Prater | G06Q 10/087 |
| 10,318,917 | B1* | 6/2019 | Goldstein | G06Q 20/208 |
| 10,332,066 | B1* | 6/2019 | Palaniappan | G01G 19/42 |
| 10,371,786 | B1* | 8/2019 | Orlov | G06Q 10/087 |
| 10,384,869 | B1* | 8/2019 | Shiee | H04N 5/23232 |
| 10,445,694 | B2* | 10/2019 | Fisher | G06T 7/70 |
| 10,548,418 | B2* | 2/2020 | Gentile | G06K 19/0716 |
| 10,643,174 | B1* | 5/2020 | Hum | G06Q 10/087 |
| 10,810,540 | B1* | 10/2020 | Gopal | G01G 19/387 |
| 2014/0055987 | A1 | 2/2014 | Lindblom et al. | |
| 2014/0201041 | A1 | 7/2014 | Meyer | |
| 2015/0262460 | A1* | 9/2015 | Ito | G08B 13/22 |
| | | | | 340/568.1 |
| 2016/0063429 | A1* | 3/2016 | Varley | G06Q 10/087 |
| | | | | 700/216 |
| 2018/0285808 | A1* | 10/2018 | Swiercz | G06Q 10/087 |
| 2019/0156277 | A1* | 5/2019 | Fisher | G06K 9/00375 |
| 2019/0340396 | A1* | 11/2019 | Mills | H04W 4/35 |
| 2020/0167719 | A1* | 5/2020 | Hohl | B65G 1/023 |
| 2020/0202177 | A1* | 6/2020 | Buibas | G01S 17/10 |

FOREIGN PATENT DOCUMENTS

| | | |
|---|---|---|
| EP | 0558305 | 9/1993 |
| FR | 2671471 | 7/1992 |
| WO | 2005033645 | 4/2005 |
| WO | 2016205629 | 12/2016 |

OTHER PUBLICATIONS

Translation of Abstract of DE 202015105014.
International Search Report for PCT/EP2014/083565 dated Mar. 20, 2018.
Translation of International Search Report for PCT/EP2017/083565 dated Mar. 20, 2018.
Written Opinion of the International Searching Authority for PCT/EP2017/083565 dated Mar. 20, 2018.
Translation of Written Opinion of the International Searching Authority for PCT/EP2017/083565 dated Mar. 20, 2018.
International Preliminary Report on Patentability for PCT/EP2017/083565 dated Jun. 25, 2019.
International Search Report for PCT/EP2017/083550 dated Mar. 16, 2018.
Translation of Written Opinion of the International Searching Authority for PCT/EP2017/083550 dated Mar. 16, 2018.
Written Opinion of the International Searching Authority for PCT/EP2017/083550 dated Mar. 16, 2018.
International Preliminary Report of Patentability for PCT/EP2017/083550 dated Jun. 25, 2019.
International Search Report for PCT/EP2017/083462 dated Mar. 13, 2018.
Translation of International Search Report for PCT/EP2017/083462 dated Mar. 13, 2018.
Written Opinion of the International Searching Authority for PCT/EP2017/083462 dated Mar. 13, 2018.
Translation of Written Opinion of the International Searching Authority for PCT/EP2017/083462 dated Mar. 13, 2018.
International Preliminary Report on Patentability for PCT/EP2017/083462 dated Jun. 25, 2019.
"Powershelf: Power at the Shelf," Feb. 2, 2015, pp. 1-13, XP055458107, Retrieved From the Internet: URL:http://powershelf.net/wordpress/, Retrieved on Mar. 9, 2018.
Translation of Abstract of DE 20221024.

* cited by examiner

APPARATUS FOR ATTACHING TO A SHELF DEVICE OF A GOODS RACK AND SYSTEM HAVING SUCH AN APPARATUS

CROSS REFERENCE TO RELATED APPLICATION

The instant application is a National Stage of PCT International Patent Application Serial No. PCT/EP2017/083462 filed Dec. 19, 2017, which claims priority to German Patent Application Serial No. 102016124964.5 filed Dec. 20, 2016, the entire specifications of both of which are expressly incorporated herein by reference.

The present invention relates to a device having an elongate base body made of a plastic material for attachment to a shelving device of a goods shelf.

The use of electronic or computer-based product registration systems is common practice in retail, especially in supermarkets and drugstores. Product registration systems process in particular the existing inventory as input quantities, which usually, for example, as part of an inventory, must be determined in a technically very complex and usually very labor-intensive manner by detecting the product arranged or shelved on the shelving devices or shelves of the goods shelves. An inventory determined at different times is also an essential input quantity for determining the product-related purchasing behavior of potential buyers or customers. Specifically, it can be determined, for example, to what extent the demand for a particular product changes over time. However, the determination of the purchasing behavior is very labor-intensive and technically very complicated, in particular as a result of the required labor-intensive and technically very complex determination of the inventory.

The present invention is therefore based on the object of providing a device that can contribute to significantly reduce the effort to determine a product-related purchasing behavior.

This object is achieved according to the invention with a device having the features of claim 1.

The device according to the invention comprises an elongate base body made of a plastic material for attachment to a shelving device of a goods shelf and at least one signaling device attached to the base body, which signaling device is provided for signaling a hand movement approaching the shelving device and/or for signaling a hand movement moving away from the shelving device.

The elongate base body made of a plastic material for attachment to a shelving device (or parking device) of a goods shelf for shelving or setting down goods is thus an elongate base body which is provided for attachment to the shelving device or which can be attached to the shelving device or is connectable to said shelving device. The shelving device can, in this case, in particular, comprise a shelf of a goods shelf or be designed in the form of a shelf of a goods shelf. For retaining the base body on the shelving device, the base body can have, for example, at least one region that is receivable in a receptacle provided on the shelving device. The at least one region can, for example, also be a hook-shaped region which can be suspended in a receptacle provided on the shelving device.

The device according to the invention is characterized in that it has at least one signaling device attached to the base body, which signaling device is provided for signaling a hand movement approaching the shelving device and/or for signaling a hand movement moving away from the shelving device or which is configured for signaling a hand movement approaching the shelving device and/or for signaling a hand movement moving away from the shelving device.

The movement of the hand approaching the shelving device can in particular be a hand movement directed towards at least one product which is arranged or parked or shelved on the shelving device.

It is understood that a hand movement approaching the shelving device is a movement in which the distance of the hand to the shelving device decreases. It is further understood that a hand movement moving away from the shelving device is a movement in which the distance of the hand to the shelving device increases.

By means of the at least one signaling device attached to the base body, when the base body is attached to the shelving device, a hand movement approaching the shelving device or in particular a hand movement approaching at least one product arranged on the shelving device can thus advantageously be signaled. The hand movement can, for example, be the hand movement of a customer, for example of a supermarket or, for example, of a drugstore, for grasping at least one product shelved or parked or arranged on the shelving device.

The signaling device is configured to signal the respective hand movement, which can be realized in particular by the fact that the signaling device is configured to output an electric signal signaling a movement or movements in the presence of said movement or movements, which signal, for example, can be designed in the form of an analog rectangular signal. Of course, this can also be a digital signal generated by analog/digital conversion, which can advantageously be further processed by means of a computer or a data processing device of a product registration system, for example, of the supermarket or, for example, of the drugstore. The signals occurring or detected over a specific or predetermined period of time, which are assigned to the hand movement approaching the shelving device or to the hand movement moving away from the shelving device, can advantageously be used, by means of methods or procedures familiar to the person skilled in the art, possibly, after the required conversion or transformation into data or digital data, in particular for a computer-based determination of the product-related purchasing behavior. In particular, the determination of the product-related purchasing behavior, which in known solutions can comprise, in particular, a complex, labor-intensive detection of the change in the inventory over a certain period of time, can be facilitated or simplified by simple manual attachment of the base body to the shelving device and subsequent computer-based evaluation of the signals output for a predetermined period of time by the signaling device, wherein the signals are assigned either to the hand movement approaching the shelving device or hand movement moving away from the shelving device.

Overall, therefore, the device according to the invention can be regarded as helping to significantly reduce the effort to determine a product-related purchasing behavior compared to the known solutions, since relevant information for the determination of product-related purchasing behavior can be provided without or without high personnel costs and also without much technical effort via the signaling of the hand movements. For example, if the signaling device is provided or configured for signaling a hand movement approaching the shelving device and for signaling a hand movement moving away from the shelving device, signaling of a hand movement approaching the shelving device and subsequent signaling of a hand movement moving away from the shelving device makes it highly probable to conclude that the customer also wants to purchase the product, in particular when no further hand moment approaching the shelving device is signaled after a waiting period of typically up to one minute, which can be attributed to a return of the product by the customer to the shelving device. It is understood that the signaling device for a more meaningful determination of the purchasing behavior can be particularly preferably additionally configured to signal a movement of at least one product approaching the shelving device and/or to signal a movement of at least one product moving away from the shelving device. Thus, it could advantageously be determined when signaling a hand movement directed away from the shelving device whether at least one product was taken from the shelving device by the customer or potential buyer.

If the signaling device is provided or configured only for signaling a hand movement approaching the shelving device, it can be concluded that at least one purchase intent of the customer or potential buyer was present from the signaling of a hand movement approaching the shelving device for determining the purchasing behavior.

If the signaling device is provided or configured only for signaling a hand movement moving away from the shelving device, it can be concluded that at least one purchase intent of the customer or potential buyer was present from the signaling of a hand movement moving away from the shelving device for determining the purchasing behavior.

It is understood that the signaling device is provided for this purpose or is configured to signal a hand movement approaching a shelving device and/or to signal a hand movement moving away from the shelving device when the base body of plastic material for attachment to the shelving device is attached to this shelving device. In this respect, the invention thus more specifically relates to a device comprising an elongate base body made of a plastic material for attachment to a shelving device of a goods shelf and at least one signaling device attached to the base body, which signaling device is provided or configured for signaling a hand movement approaching the shelving device and/or for signaling moving away from the shelving device, when the base body is attached to the shelving device or is connected thereto.

In this respect, it is also understood that the three-dimensional detection range that can be detected or generated by the signaling device, in which the respective hand movement must take place, so that the signaling device can signal the respective hand movement, when the signaling device is attached to the shelving device or connected thereto, is located in the spatial area in which a human hand must move to grasp or remove a shelved product on the shelving device. In this respect, the invention thus more specifically relates to a device comprising an elongate base body made of a plastic material for attachment to a shelving device of a goods shelf and at least one signaling device attached to the base body for signaling a hand movement approaching the shelving device in a three-dimensional detection range of the signaling device and/or for signaling hand movement moving away from the shelving device being provided or being configured in a three-dimensional detection range of the signaling device.

The signaling device particularly preferably comprises a motion detector or the signaling device is particularly preferably identical to a motion detector, wherein the motion detector outputs a signal with a hand movement approaching the shelving device in a three-dimensional detection range of the motion detector and/or a hand movement moving away from the shelving device in a three-dimensional detection range of the motion detector, that signal being assigned to the hand movement moving away from the shelving device or to the hand movement approaching the shelving device. The motion detector can be a motion detector in which, depending on the version, electromagnetic waves (HF or double radar) or ultrasonic waves are present in the three-dimensional detection range. In particular, it can be a motion detector having a PIR sensor or in the form of a PIR sensor (of "passive infrared"). This reacts by utilizing the pyro-electricity of its receiver surface on a temperature change, here in particular caused by the moving human hand.

In a preferred embodiment, the signaling device can also comprise a camera or a digital camera and an image processing device having pattern recognition, wherein the pattern recognition is configured to recognize a hand movement approaching the shelving device and detected by the camera or digital camera and/or a hand movement moving away from the shelving device and detected by the camera or digital camera, and wherein the signaling device is configured, upon detection of the hand movement approaching the shelving device and/or hand movement moving away from the shelving device, to output an analog or digital signal for signaling the hand movement.

If the signaling device or the respective signaling device is identical to a motion detector, the device according to the invention can comprise an elongate base body made of a plastic material for attachment to a shelving device of a goods shelf and at least one motion detector attached to the base body, which signal is provided or is configured for signaling a hand movement approaching the shelving device and/or for signaling a hand movement moving away from the shelving device.

The elongate base body made of a plastic material is particularly preferably an extruded base body or a base body produced by way of extrusion. Such base bodies are inexpensive to produce in great variety and high consistent quality.

In a preferred embodiment of the device according to the invention, the base body has a channel extending over the entire length of the base body, wherein the signaling device is arranged in the channel or arranged in the channel and attached in the channel on the base body. The signaling device can be effectively protected against external influences, in particular mechanical shocks in a channel of the base body.

The channel is particularly preferably a channel open to a longitudinal side of the base body, so that the detection range of the signaling device can advantageously extend along the entire length of the base body from the signaling device into the surroundings of the signaling device without possibly interfering ranges of the base body.

In particular, a plurality of signaling devices can be arranged in the channel.

In particular, a plurality of two to at least five or a plurality of two to at least ten or a plurality of two to at least fifteen or a plurality of two to at least twenty signaling devices can be arranged in the channel.

Particularly preferably, the signaling devices are arranged in the channel or arranged successively in the channel, forming a row extending along the longitudinal axis of the base body. This row-shaped arrangement advantageously enables an arrangement or attachment of the device to the shelving device of the goods shelf, in which each signaling device can each be assigned to a section of the shelving device or can be responsible for this section. Thus, in each case a product-specific or product type-specific determination can be realized using the respective signaling device for a variety of products arranged or shelved on the shelving device. To realize this advantageous arrangement or attachment of the device to the shelving device of the goods shelf, if the shelving device is formed elongated, the elongate base body can preferably be attachable to the shelving device in an arrangement in which a surface of the base body extending along the longitudinal axis of the base body faces a surface of the shelving device extending along the longitudinal axis of the shelving device. Or in other words: The elongate base body can, provided that the shelving device is designed elongated, preferably be attachable or supportable to the shelving device or be connectable to the shelving device such that a surface of the base body extending along the longitudinal axis of the base body faces a surface of the shelving device extending along the longitudinal axis of the shelving device.

The invention also relates to a component for a goods shelf comprising a device according to the invention and a shelving device for the goods shelf, wherein the device is attached to the shelving device or is connected thereto. In the case of the component, the device according to the invention can in particular also be detachably connected to the shelving device.

The invention further relates to a system having a device according to the invention and at least one closure means, wherein the base body of the device has two opposite end sections, wherein each of the end sections has one of two opposite channel end sections of the channel, wherein the system has at least two conductors for the power supply of the signaling device or the at least one signaling device, wherein each of the conductors has two conductor end sections and an intermediate section, wherein the intermediate section of each conductor is arranged in the channel and each of the conductor end sections is arranged in each of the two opposite channel end sections with at least one subsection of each conductor, wherein the closure means has at least two electrical supply lines, which are provided to establish a connection or an electrically conductive connection to a current source, wherein the closure means is connectable to at least one of the two opposite end sections of the base body, wherein by connecting the closure means to the end section of the base body, each supply line end section of each of the supply lines is electrically conductively contactable with each conductor end section of the conductor end sections, which are arranged in the channel end section of the end section of the base body with at least one subsection or which are arranged in the channel end section of the end section of the base body with at least one subsection to which the closure means is to be connected or is connected.

The channel or the receptacle extends over the entire length of the base body or the channel or the receptacle extends from one of two opposite ends of the base body to the other of the two opposite ends of the base body.

The base body has two opposite end sections or the base body has two mutually longitudinally opposite end sections, wherein each of the end sections of the base body has one or one each of two opposite channel end sections of the channel or has one or one each of two longitudinally mutually opposite channel end sections of the channel (or has one of two opposite receptacle end sections of the receptacle or has one of two longitudinally mutually opposite receptacle end sections of the receptacle) or wherein respectively a channel end section or a receptacle end section is located in each case on one of two opposite, or longitudinally mutually opposite, end sections of the base body.

The channel of the base body extends over the entire length of the base body. The channel is particularly preferably a channel oriented parallel to the longitudinal axis of the base body, or the channel is particularly preferably an elongate channel aligned parallel to the longitudinal axis of the base body. If it is preferably an extruded base body, the channel is a channel formed during extrusion of the base body. As a result of the extension over the entire length of the base body, the channel or the receptacle is open or accessible to both end faces of the base body.

The system according to the invention has at least two conductors for the power supply of the signaling device or signaling devices, wherein each of the conductors has two conductor end sections and an intermediate section, wherein the intermediate section of each conductor is arranged in the channel and from each conductor each of the conductor end sections is arranged in each of the two opposite channel end sections with at least a subsection. To realize the power supply, each of the conductors is electrically conductively connectable to a respective power supply contact of the signaling device.

The conductors spaced from each other can be conductors with a design familiar to one skilled in the art. For example, the conductors can be designed in particular in the form of conductor tracks, wherein the conductor tracks can be made of copper, tinned copper, copper-plated aluminum or galvanized aluminum or copper-plated gold or silver or graphite or conductive polymers (such as PEDOT-PSS, PANI, etc.) or from different carbon modifications (such as CNTs, fullerenes, etc.). The conductor track can be extruded or laminated or printed to hold it in the channel, for example, on the plastic material of the body, or each of the conductor tracks can be formed in the channel in the form of an elongate segment of an elongate conductive body to hold the same, wherein a further segment of the elongate conductive body can be extruded into the plastic material of the extruded base body, for example, extruded in, pressed in, glued in or clipped in.

The system according to the invention is characterized in that the closure means (or the at least one closure means) has at least two electrical supply lines which are provided to establish a connection to a current source or which are provided for connection to a current source, wherein the closure means is connectable to at least one of the two opposite end sections of the base body, and wherein by connecting the closure means to the end section of the base body, each supply line end section of each of the supply lines is electrically conductively contactable to each conductor end section of the conductor end sections, which are arranged in the channel end section of the end section with the at least one subsection.

The provided electrical contacting of the supply line end sections of the closure means according to the invention with the conductor end sections of the conductors for powering the signaling devices advantageously enables, in a very simple and practical manner, feasible provision of power supply or voltage supply of the signaling devices via the electrical supply lines of the closure means, which are provided to establish a connection to a current source or an external current source or which are provided to establish an electrically conductive connection to a current source or an external current source or a voltage source or an external voltage source.

In particular, when a plurality of signaling devices are arranged in the channel, said signaling devices can be supplied with current or voltage via at least two of the conductors (that is, in particular in a parallel connection), the power supply of all signaling devices can thus be realized simply by connecting the closure means to the respective end section of the base body, after this, the supply lines of the closure means are connected to a current source or electrical conductive connections of the supply lines are established to a current source and the signaling devices are energized by the current source via the supply lines or supplied with a supply voltage, wherein, for example, with a DC current source, one of the supply lines is connectable to the positive pole of the current source and the other of the two supply lines to the negative pole of the current source. On the whole, as a result of the power supply of the signaling devices, which can be realized very simply by means of the system according to the invention, the cabling expenditure for the provision of the power supply can be reduced or significantly reduced. Only the supply lines are to be connected to the respective current source or voltage source. A complex cabling of each individual signaling device can be advantageously eliminated. The installation effort and thus in particular installation costs can thus be significantly reduced.

In the system according to the invention, each of the conductors has two conductor end sections, each of which is arranged in each one of the two opposite channel end sections with at least one subsection. That is, in one of the conductors, a first of the two conductor end sections is arranged in a first of the two opposite channel end sections with at least a subsection, and the second conductor end section of this conductor is arranged in the second of the two opposite channel end sections with at least a subsection. An intermediate section of the respective conductor extending from the first conductor end section to the second conductor end section or connecting the conductor end sections is then arranged in a middle region of the channel reaching from the first channel end section to the second channel end section. It is understood that each of the conductors is formed particularly preferably rectilinear and particularly preferably extends parallel or essentially parallel to the longitudinal axis of the extruded base body. In particular, each of the conductors can preferably extend over the entire length of the base body or channel. However, this is not mandatory.

The closure means has at least two electrical supply lines which are provided for establishing a connection to a current source or for connection to a current source. It is understood that the supply lines can at least in sections, in particular, be current-carrying conductors or inner conductors or cores of a supply cable, which are particularly preferably current-carrying conductors or inner conductors of a single supply cable.

It is understood that each of the conductor end sections can be formed, for example, in the form of a current-conducting contact of a plug or mating connector. It is also understood that each of the supply line end sections can also be designed in the form of a current-conducting contact of a corresponding mating connector or plug, so that plug connections can also be formed by connecting the closure means to the end section of the base body in order to realize the electrically conductive contacting or the electrical conductive connection between the supply line end sections and the conductor end sections.

The closure means is connectable to at least one of the two opposite end sections of the base body, wherein the closure means is connectable to the end section of the base body in a preferably frictional connectable manner. In particular, the closure means can preferably have an insertion body, which can be inserted into the channel of the extruded base body at the end face to form a frictional connection with the extruded base body.

Particularly preferably, the closure means with at least one of the two opposite end sections of the body is detachably connectable or manually detachably connectable, so that the closure means can be advantageously detached, in particular for maintenance or repair purposes of the extruded body, and possibly also connected thereto again.

By connecting the closure means to the end section of the base body, each supply line end section of each of the supply lines is electrically conductively contactable with each one of a conductor end section of the conductor end sections arranged in the channel end section of the end section with at least a subsection. This contactability can be carried out in a manner familiar to those skilled in the art in particular by suitable arrangement of the supply line end sections. Thus, for example, each of the supply line end sections in the case of an existing connection can protrude between the base body and closure means, in particular, into the channel of the base body in order to realize the contacting with the conductor end sections, which are respectively arranged with at least one subsection in the channel.

Each conductor has two conductor end sections, one of which is arranged in one of the two opposite channel end sections with at least one subsection. The respective conductor end section is thus arranged with at least one subsection in one of the two opposite channel end sections, so that the respective conductor end section can in particular also be arranged completely or wholly in the respective channel end section or can be arranged in the channel, without protruding from the channel end section. According to the invention, however, it can also be provided that only a subsection of the respective conductor end section is arranged in the channel end section, so that a further subsection of the respective conductor end section can thus be arranged in particular also outside the respective channel end section or can protrude from respective channel end section.

In a practical embodiment of the system according to the invention, the base body has a further channel, wherein a plurality of electronic display devices for displaying product-related information are receivable in the further channel, wherein the further channel extends over the entire length of the base body, wherein each of the end sections of the base body has one of two opposing channel end sections of the further channel, wherein the display devices are receivable in the further channel, wherein the system has at least two conductors for the power supply of the display devices, wherein each of the conductors has two conductor end sections and an intermediate section, wherein the intermediate section of each conductor is arranged in the further channel and from each conductor each of the conductor end sections is arranged in each of the two opposite channel end sections of the further channel with at least one subsection, wherein by receiving the display devices in the further channel in each case a power supply contact of each display device is electrically conductively contactable to each of the conductors, wherein the closure means has at least two further electrical supply lines, which are provided for establishing a connection to a current source, wherein by connecting the closure means to the end section of the base body, each supply line end section of each of the further supply lines is electrically conductively contactable to each conductor end section of the conductor end sections, which are arranged in the channel end section of the end section of the base body with at least a subsection, thus to the end section of the base body with which the closure means is connected or is to be connected, wherein the or said channel end section is a channel end section of the further channel.

In the above practical embodiment of the system according to the invention, the base body has a further channel or a second channel, wherein a plurality of electronic display devices for displaying product-related information is receivable in the channel.

The display devices are receivable in the channel, wherein the display devices in the channel are successively receivable in the channel for realizing a row of successively arranged display devices preferably along the longitudinal axis of the base body or are receivable or successively receivable in the channel to form a row extending along the longitudinal axis of the base body. This row-shaped arrangement advantageously enables an arrangement of the system in the vicinity of a goods shelf, in which respectively a display device from the potential buyer or prospective buyers can be assigned directly to the associated product, and namely the product among several products, which are also parked or arranged in a row successively on a shelving device or a shelf of a goods shelf.

The further or second channel of the base body, which is provided or configured to receive the display devices, extends over the entire length of the base body. The further channel is particularly preferably a channel oriented parallel to the longitudinal axis of the base body, or the further channel is particularly preferably an elongate channel aligned parallel to the longitudinal axis of the base body. If it is preferably an extruded base body, the further channel is a further channel formed during extrusion of the base body. As a result of the extension over the entire length of the base body, the further channel or the further receptacle is open or accessible to both end faces of the base body. Particularly preferably, the further channel is also open or accessible to a longitudinal side of the base body, so that the display devices are receivable in the further channel from the longitudinal side. This has the advantage that the display devices for realizing a row of display devices arranged successively on the base body do not have to be inserted at the end face sequentially in the further channel, which can prove to be difficult due to tilting depending on the design of the further channel.

The display devices are receivable in the channel or each of the display devices are receivable in the further channel, wherein the display devices/each display device can in particular be frictionally receivable in the further channel. Particularly practically, the display devices or each display device can form a detachable snap connection with the extruded base body by receiving in the other channel.

The above practical embodiment of the system according to the invention has at least two conductors for the power supply of the display devices, wherein each conductor has two conductor end sections and an intermediate section.

The intermediate section of each conductor for the power supply of the display devices is arranged in the further channel and from each conductor, each of the conductor end sections is arranged in each of the two opposite channel end sections of the further channel with at least one subsection.

The conductors spaced apart from each other for the power supply of the display devices can have conductors with a form familiar to one skilled in the art. For example, the conductors can be formed in particular in the form of conductor tracks, wherein the conductor tracks can be made of copper, tinned copper, copper-plated aluminum or galvanized aluminum or copper-plated gold or silver or graphite or conductive polymers (such as PEDOT-PSS, PANI, etc.) or from different carbon modifications (such as CNTs, fullerenes, etc.). The conductor track can be extruded or laminated or printed to hold it in the channel, for example, on the plastic material of the body, or each of the conductor tracks can be formed in the channel in the form of an elongate segment of an elongate conductive body to hold the same, wherein a further segment of the elongate conductive body can be extruded into the plastic material of the extruded base body, for example, extruded in, pressed in, glued in or clipped in.

The above practical embodiment of the system according to the invention is characterized in that it combines a possible determination of a product-related purchasing behavior with a further channel for receiving the electronic display devices via the signaling device or signaling devices, wherein advantageously by receiving the display devices in the further channel, each power supply contact of each display device or each power supply connection of each display device is electrically conductively contactable to one of the conductors. Thus, in a simple and practical way, for each product-related information item display to be received in the channel for display, a contacting of the conductors arranged in the channel required for the power supply of the display devices is realized with the power supply contacts or voltage supply contacts of the display devices or the power supply connections or the voltage supply connections of the display devices.

Furthermore, the system according to the invention is characterized in that the closure means (or the at least one closure means) additionally or further has at least two further electrical supply lines which are provided for establishing a connection to a current source or which are provided for connection to a current source wherein the closure means is connectable to at least one of the two opposite end sections of the base body, wherein by connecting the closure means to the end section of the base body each supply line end section of each of the further supply lines is electrically conductively contactable to each conductor end section of the conductor end sections which are arranged in the channel end section of the end section of the base body with at least a subsection.

The contactability of the power supply contacts of each of the display devices provided according to the invention with the conductors arranged in the channel by receiving the display devices in the channel together with the electrical contacting of the supply line end sections of the closure means with the conductor end sections of the conductors by simply connecting the closure means to the end section advantageously makes it possible to provide the power supply or power supply of the display devices via the electrical supply lines of the closure means in a very simple and practical manner, which are provided for establishing a connection to a current source or an external current source or for establishing an electrically conductive connection to a current source or an external current source or a voltage source or an external voltage source. Overall, therefore, the power supply of all display devices and the signaling device or signaling devices can thus be realized simply by receiving the display devices in the channel, the closure means is connected to the end section of the base body, after this, all supply lines of the closure means are connected to a current source or multiple current sources or electrical conductive connections of the supply lines are established to one or more current sources and the display devices and the signaling device or signaling devices are energized by the current source via the supply lines or supplied with a supply voltage, wherein this can be done, for example, with a DC current source in that one of the supply lines is connected to the positive pole of the current source and the other of the two supply lines is connected to the negative pole of the current source. Overall, as a result of the power supply of the display devices and the signaling device or signaling devices, which can be realized very simply by means of the above practical embodiment of the system according to the invention, the cabling expenditure for the provision of the power supply can be reduced or significantly reduced. After receiving the display devices in the channel and connecting the closure means to the respective base body end section, only the supply lines are to be connected to the respective current source or voltage source. A complex wiring of each display device, as is the case with known solutions, can be advantageously eliminated. The installation effort and thus in particular installation costs can thus be significantly reduced.

The display devices for displaying product-related information can be familiar or known display devices having an electronic display, which are provided or configured for displaying product-related information. In particular, it can be display devices which are designed in the form of so-called ESLs (Electronic Shelf Labels), which are also referred to as electronic price tags. In terms of size, these display devices can have a length within a range of 2 to 125 cm, a height within a range of 2 to 50 cm, and a thickness within a range of 0.2 to 2 cm.

The product-related information can be any information about the respective product, for example, the price of the product, the description of the product, the expiry date, the weight etc.

In the above practical embodiment of the system according to the invention, each of the conductors has two conductor end sections, one of which is arranged in one of the two opposite channel end sections with at least one subsection. That is, in one of the conductors, a first of the two conductor end sections is arranged in a first of the two opposite channel end sections with at least a subsection, and the second conductor end section of this conductor is arranged in the second of the two opposite channel end sections with at least a subsection. An intermediate section of the respective conductor extending from the first conductor end section to the second conductor end section or connecting the conductor end sections is then arranged in a middle region of the channel reaching from the first channel end section to the second channel end section. It is understood that each of the conductors is formed particularly preferably rectilinear and particularly preferably extends parallel or essentially parallel to the longitudinal axis of the extruded base body. In particular, each of the conductors can preferably also extend over the entire length of the base body or further channel, although this is not mandatory. According to the invention, only one of the power supply contacts of the display device can be electrically conductively connected to one of the conductors by receiving a display device in the further channel. This contactability can be made in a manner familiar to the person skilled in the art, in particular by suitably adapting the dimensions of the channel to the relevant dimensions of the display device(s).

The closure means has at least two further electrical supply lines which are provided for establishing a connection to a current source or for connection to a current source. It is understood that the further supply lines can at least in sections, in particular, be current-carrying conductors or inner conductors or cores of a supply cable, which are particularly preferably current-carrying conductors or inner conductors of a single supply cable.

It is understood that each of the conductor end sections can be designed, for example, in the form of a current-conducting contact of a plug or mating connector. It is also understood that each of the supply line end sections can also be designed in the form of a current-conducting contact of a corresponding mating connector or plug, so that plug connections can also be formed by connecting the closure means to the end section of the base body in order to realize the electrically conductive contacting or the electrical conductive connection between the supply line end sections and the conductor end sections.

By connecting the closure means to the end section of the base body, one supply line end section of each of the further supply lines is electrically conductively contacted to one respective conductor end section of the conductor end sections, which in the further channel are arranged in the channel end section of the end section with at least one subsection section. This contactability can be carried out in a manner familiar to those skilled in the art in particular by suitable arrangement of the further supply line end sections. Thus, for example, each of the further supply line end sections in the case of an existing connection can protrude between the base body and closure means, in particular, into the channel of the base body in order to realize the contacting with the conductor end sections, which are respectively arranged with at least one subsection in the channel.

Each conductor for the power supply of the display devices has two conductor end sections, one of which is arranged in each of the two opposite channel end sections with at least one subsection. The respective conductor end section is thus arranged with at least one subsection in one of the two opposite channel end sections, so that the respective conductor end section can in particular also be arranged completely or wholly in the respective channel end section or can be arranged in the channel, without protruding from the channel end section. According to the invention, however, it can also be provided that only a subsection of the respective conductor end section is arranged in the channel end section, so that a further subsection of the respective conductor end section can thus be arranged in particular also outside the respective channel end section or can protrude from respective channel end section.

In a preferred embodiment of the system according to the invention, the closure means has a flat body made of a plastic material with two opposite sides and an insertion body made of a plastic material connected to one of the two sides, which insertion body is provided for insertion into the channel in which the at least one signaling device is arranged, wherein the insertion body for connecting the closure means to the end section of the body is frictionally receivable by end-face insertion into the channel in the channel.

By means of this closure means, a simple insertion process can be realized in a very simple and practical way, connecting the supply line end sections to the conductor end sections. The provision of the flat body advantageously enables a weight-saving and visually appealing formation of the flat body. The insertion body is frictionally receivable or is receivable wholly or at least partially for connecting the closure means to the end section of the base body by end-face insertion into the channel in the channel or the insertion body is particularly preferably retainably clamped to connect the closure means to the end section of the body by end-face insertion into the channel in the channel or retainable forming a clamping tension in the channel. It is understood that the connection between the closure means and the base body that can be realized by means of this preferred embodiment can particularly preferably be a detachable or manually detachable connection. The insertion body can therefore be particularly preferably pulled out of the channel or be manually pulled out of the channel. Due to the preferably provided detachability of the connection between the closure means and the base body, in particular, maintenance work or repairs can advantageously be carried out in a simple and practical manner.

The plastic material from which the flat body and the insertion body can made of can be, for example, thermoplastics, thermosetting plastics and elastomers. Preferred thermoplastic plastics are: PVC, ABS, ASA, PET, PC, PS, PA and all plastics from the group of polyolefins, polyacrylates, polycarbonates and polyesters.

Particularly practically, the closure means preferably has a further insertion body, which is provided for insertion into the further channel, wherein the further insertion body is frictionally receivable for connecting the closure means to the end section of the base body by end-face insertion into the further channel, in the further channel. It can be made particularly advantageous by a simple connection process, in which the two insertion bodies are inserted into the respective channel for the power supply of the display devices and a contacting to all conductors is established to the signaling device or the signaling devices.

The supply line end sections which can be contacted with the conductor end sections are particularly preferably provided on the insertion body. Since the insertion body is frictionally receivable in the channel by insertion, stable electrically conductive contacts of the supply line end sections with the conductor end sections can also be realized advantageously by the provision of the supply line end sections on the insertion body. Correspondingly, the further supply line end sections that can be contacted with the respective conductor end sections are also particularly preferably provided on the further insertion body in order to be able to advantageously realize the stable electrically conductive contacts for energizing the display devices.

Particularly preferably, the end face of the base body can be covered by end-face insertion of the insertion body in the channel of the flat element. The hereby provided cover option can create a visually appealing closure. In particular, the flat element can have a design which is advantageously connectable by end-face insertion of the insertion body into the channel flush with the base body, along with the creation of a visually appealing closure.

The above practical embodiment of the system according to the invention is particularly advantageous for the arrangement or attachment in the vicinity or in the immediate vicinity of shelving devices, such as shelves of goods shelves provided so that a buyer or a potential buyer of a product can directly identify the display device respectively assigned to the product.

The base body is advantageously an extruded base body made of a plastic material, that is, a base body produced by extrusion. By means of extrusion, a plurality of basic bodies can be produced with consistently high quality within the scope of automated production. The plastic material of which the elongated body is made of can be, for example, thermoplastics, thermosetting plastics and elastomers. Preferred thermoplastic plastics are: PVC, ABS, ASA, PET, PC, PS, PA and all plastics from the group of polyolefins, polyacrylates, polycarbonates and polyesters.

Particularly practically, closure means is detachably connectable to at least one of the two opposite end sections of the body.

The invention also relates to a product presentation system comprising an above system according to the invention and at least one goods shelf having at least two retaining posts and at least one shelving device, wherein the base body of the device is attachable to the shelving device, wherein the shelving device has a shelf element for shelving products and two retaining elements, wherein the retaining elements are connected to the shelf element, wherein each retaining post has at least one receptacle, in which each of the retaining elements for retaining the shelving device is receivable on the retaining post, wherein at least one of the retaining posts has at least two electrical conductors, preferably at least four electrical conductors, which are provided for connection to a current source, wherein at least one of the retaining elements has at least two electrical connection elements, wherein each of the supply lines or each one of all supply lines of the closure means is connectable to each connection element, wherein each connection element is electrically conductively contactable by receiving the retaining element in the receptacle of the retaining post with one of the conductors of the retaining post.

The product presentation system according to the invention is characterized in that it combines the advantages of the above system according to the invention with at least two retaining posts and at least one shelving device. The retaining posts and the at least one shelving device of the goods shelf, characterized in that via the electrical conductors of the retaining post and the electrical connection elements of the retaining elements after connecting the supply lines of the closure means to the connection elements by simply performable receiving of the retaining elements in the receptacles of the retaining post, and namely for holding or attaching the shelving device to the retaining post, and subsequent connection of the conductor of the retaining post to a current source, electrically conductive connections of the supply lines of the closure means to the current source can be established, namely for energizing or for the voltage supply of electronic display devices received in the further channel of the base body of the system according to the invention and/or the signaling device or signaling devices arranged in the channel or the first channel of the base body.

Each retaining post has at least one receptacle or a plurality of receptacles into which each of the retaining elements for retaining the shelving device are receivable on the retaining post. In particular, each of the retaining elements can have an end region which can be hooked into the respective receptacle, wherein the electrical connection elements can be provided at the end region. In particular, the conductors of the retaining posts can be arranged in a longitudinal channel of the retaining post, wherein in the suspended state of the end region for each connection element, there is an electrically conductive contact to the respective electrical conductor of the retaining post.

The elongate base body of the system according to the invention is attachable to the shelving device or is connectable to the shelving device. In particular, in the case of an elongate shelving device, the elongate base body is attachable to the shelving device in an arrangement in which a surface of the base body extending along the longitudinal axis of the base body faces a surface of the shelf element extending along the longitudinal axis of the shelf element. Or in other words: In particular, in the case of an elongate designed shelving device, the elongate base body is attachable to the shelving device in such a way that a surface of the base body extending along the longitudinal axis of the base body faces a surface of the shelf element extending along the longitudinal axis of the shelf element. In this arrangement, in which the channel of the base body of the system particularly preferably extends parallel to the longitudinal axis of the shelf element, in a row-shaped arrangement of a plurality of signaling devices in the channel, an arrangement or attachment of the device to the shelving device of the goods shelf can be advantageously realized, in which a signaling device can each be assigned to a section of the shelving device or can be responsible for this section. Thus, a product-specific or product-type-specific analysis, which can be used for determining the product-specific purchasing behavior, can be advantageously realized using the respective signaling device for a plurality of products arranged or shelved on the shelving device.

Particularly practically, the retaining elements are detachably connected to the shelf element.

Figure 2:
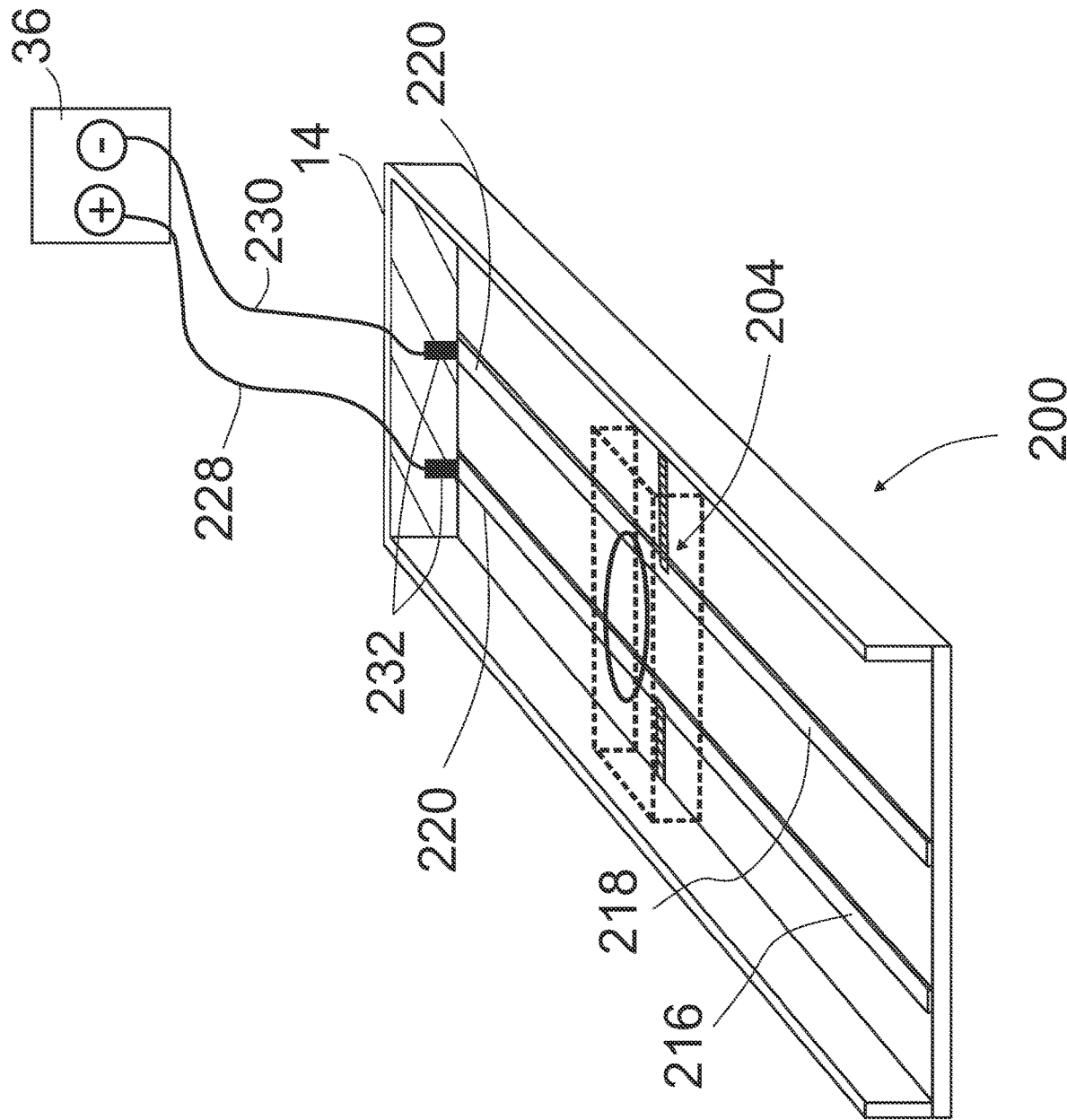
Figure 3:
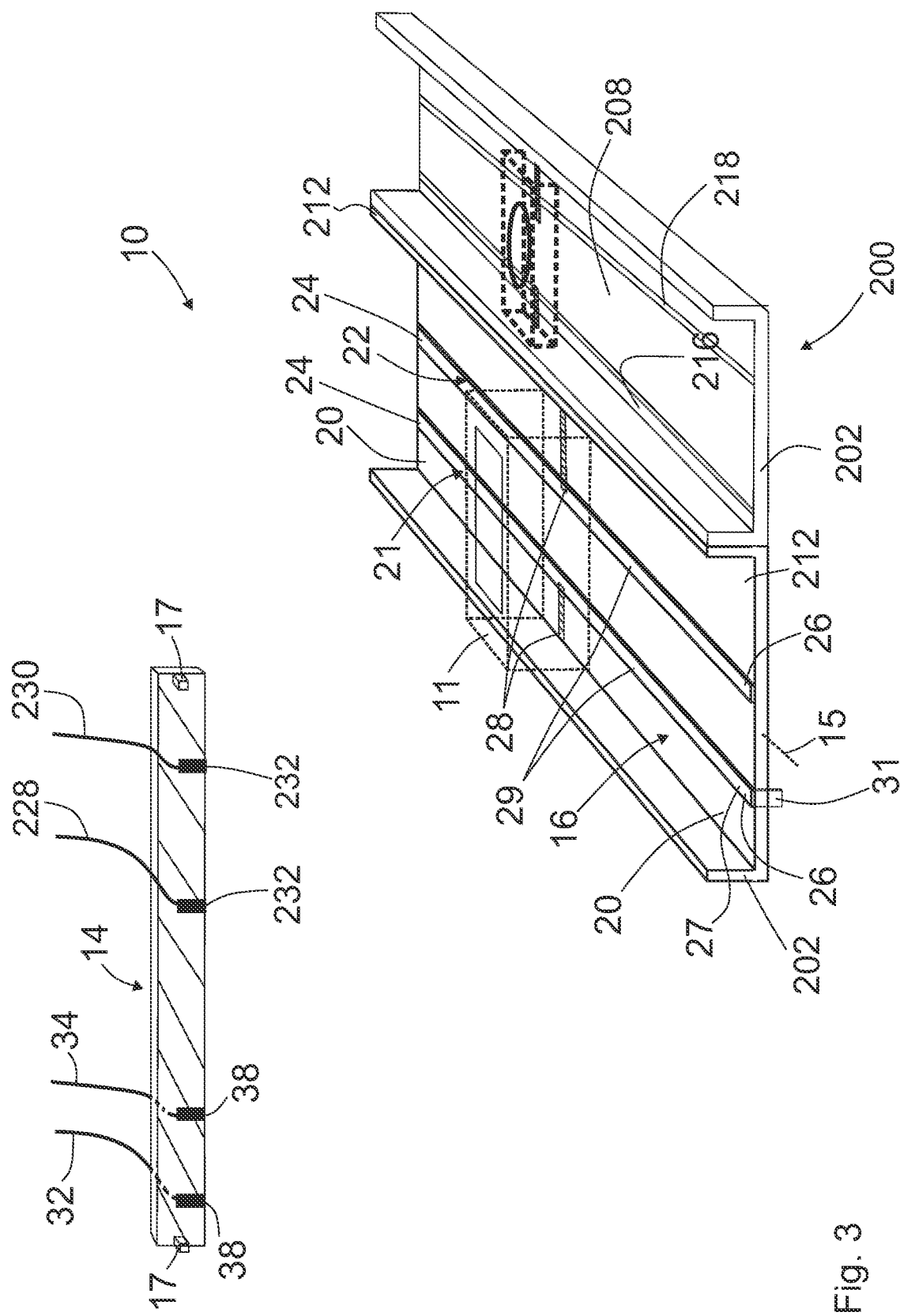
Figure 4:
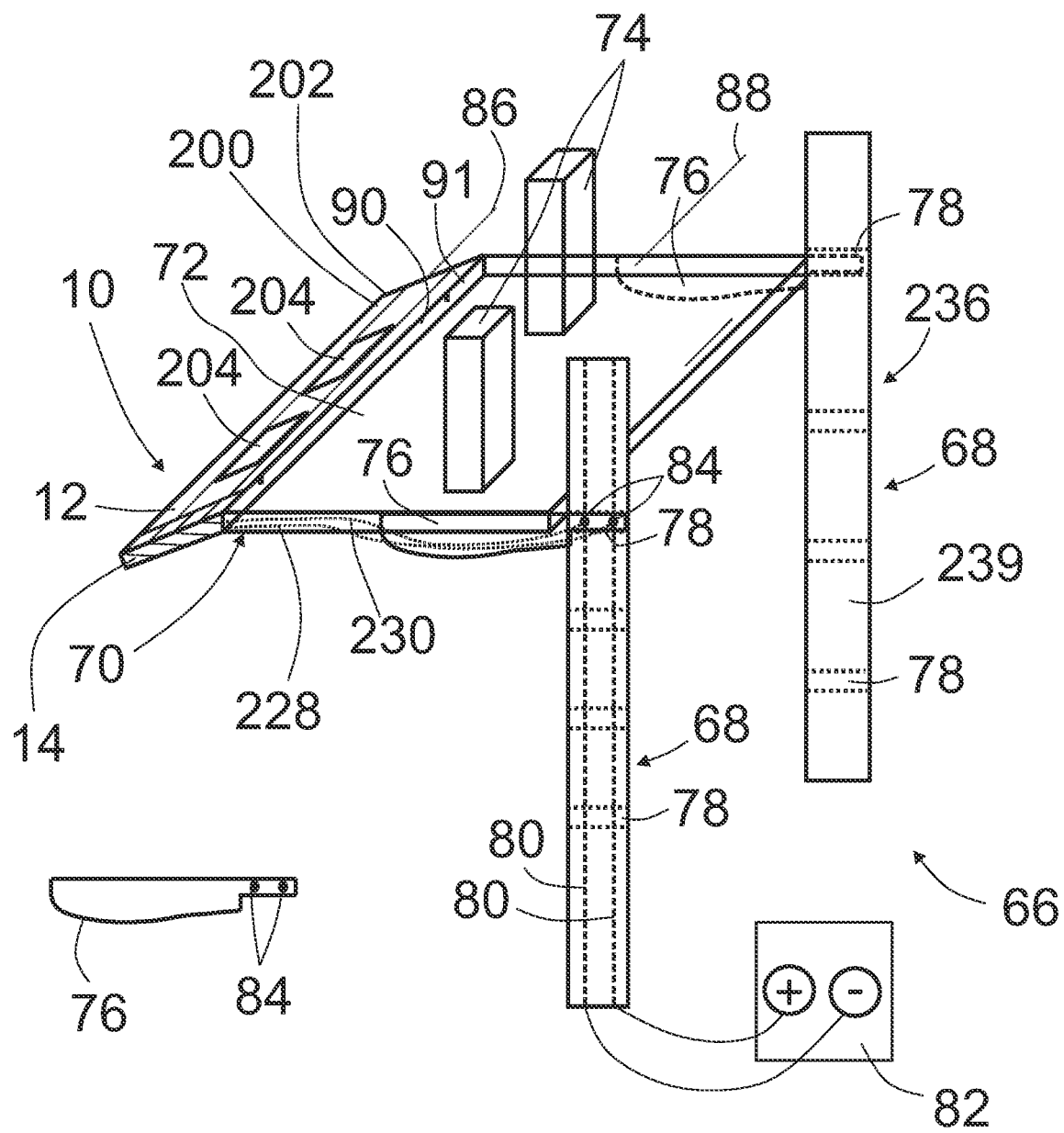
Figure 5:
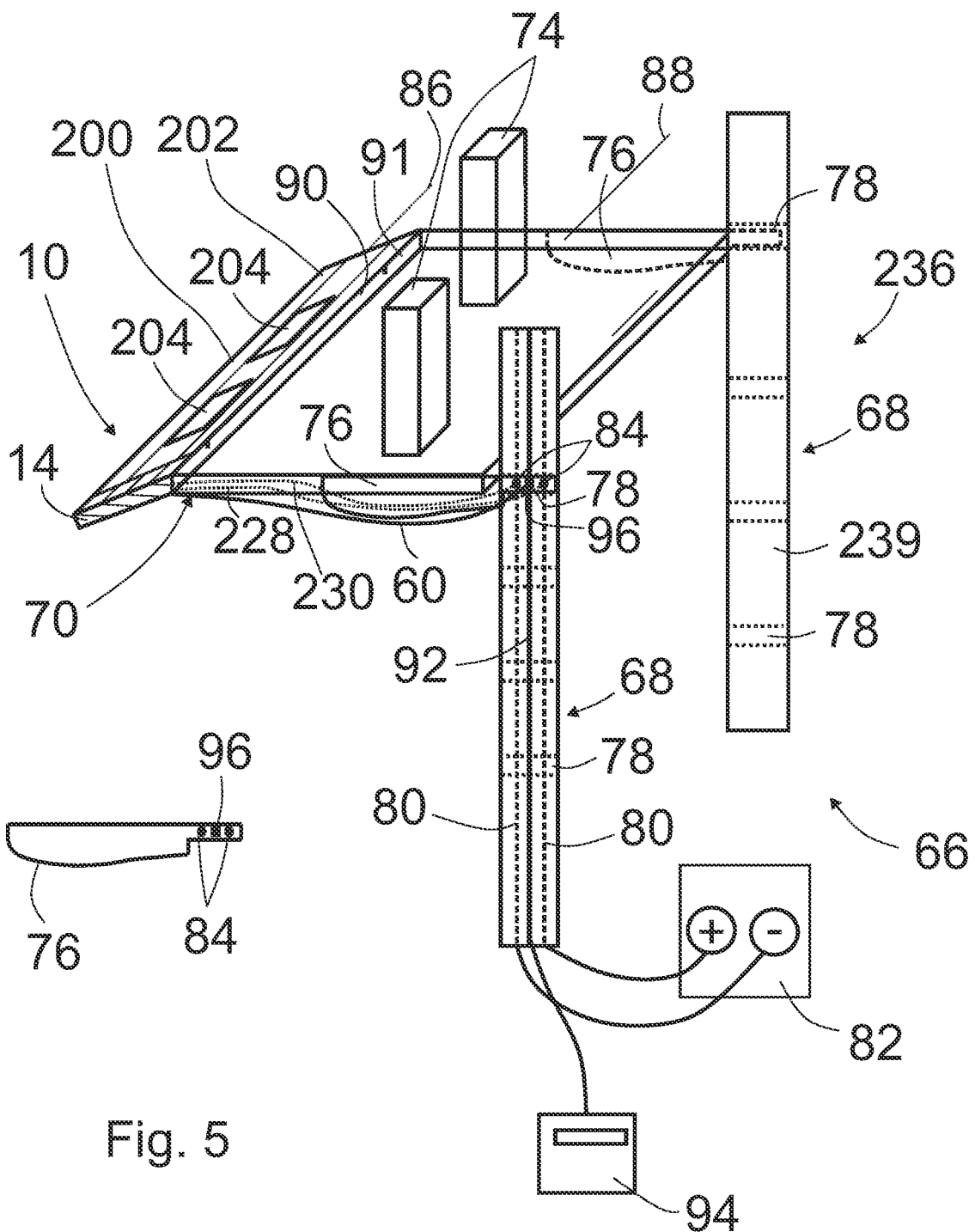
Figure 6:
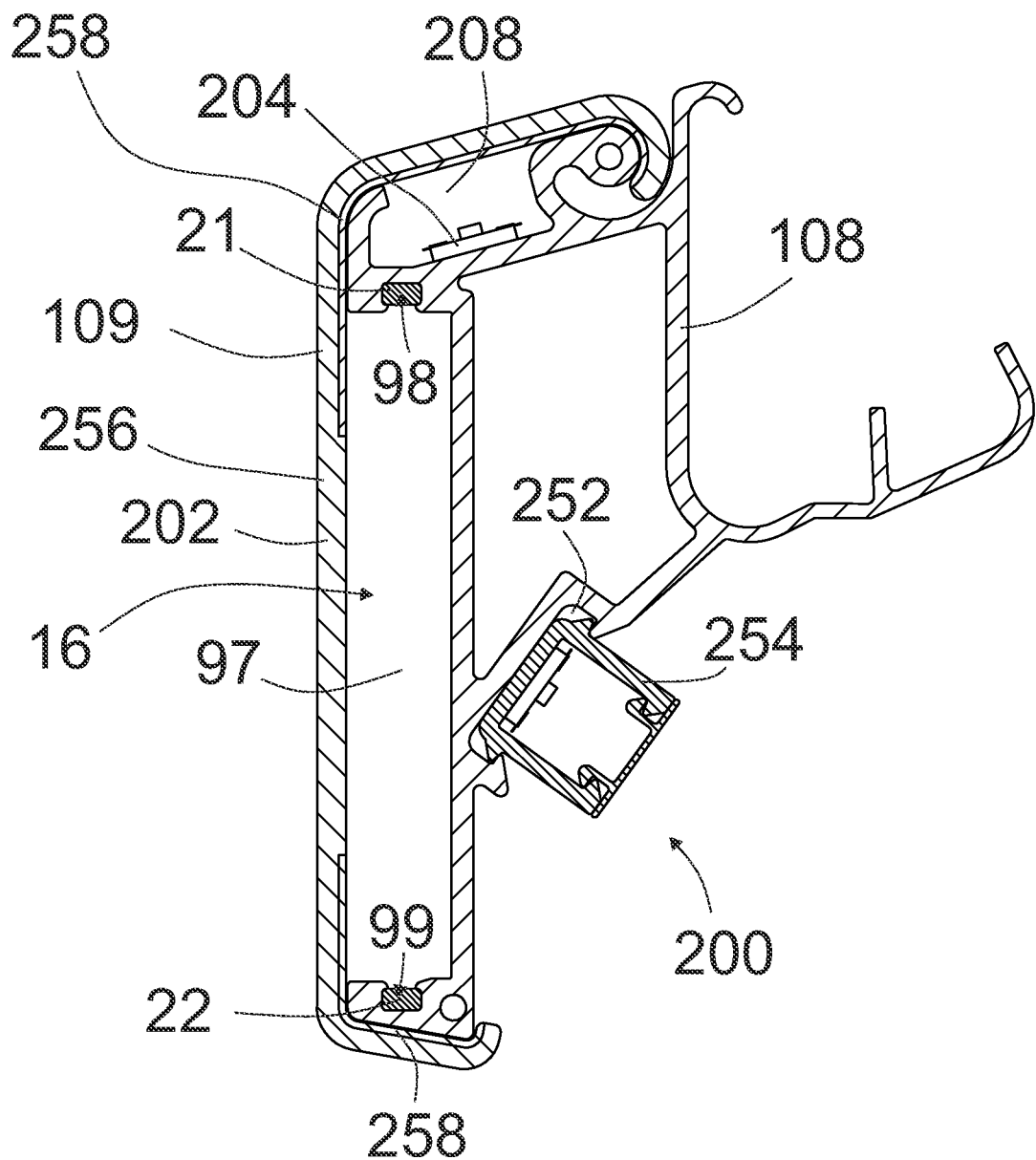
Figure 7:
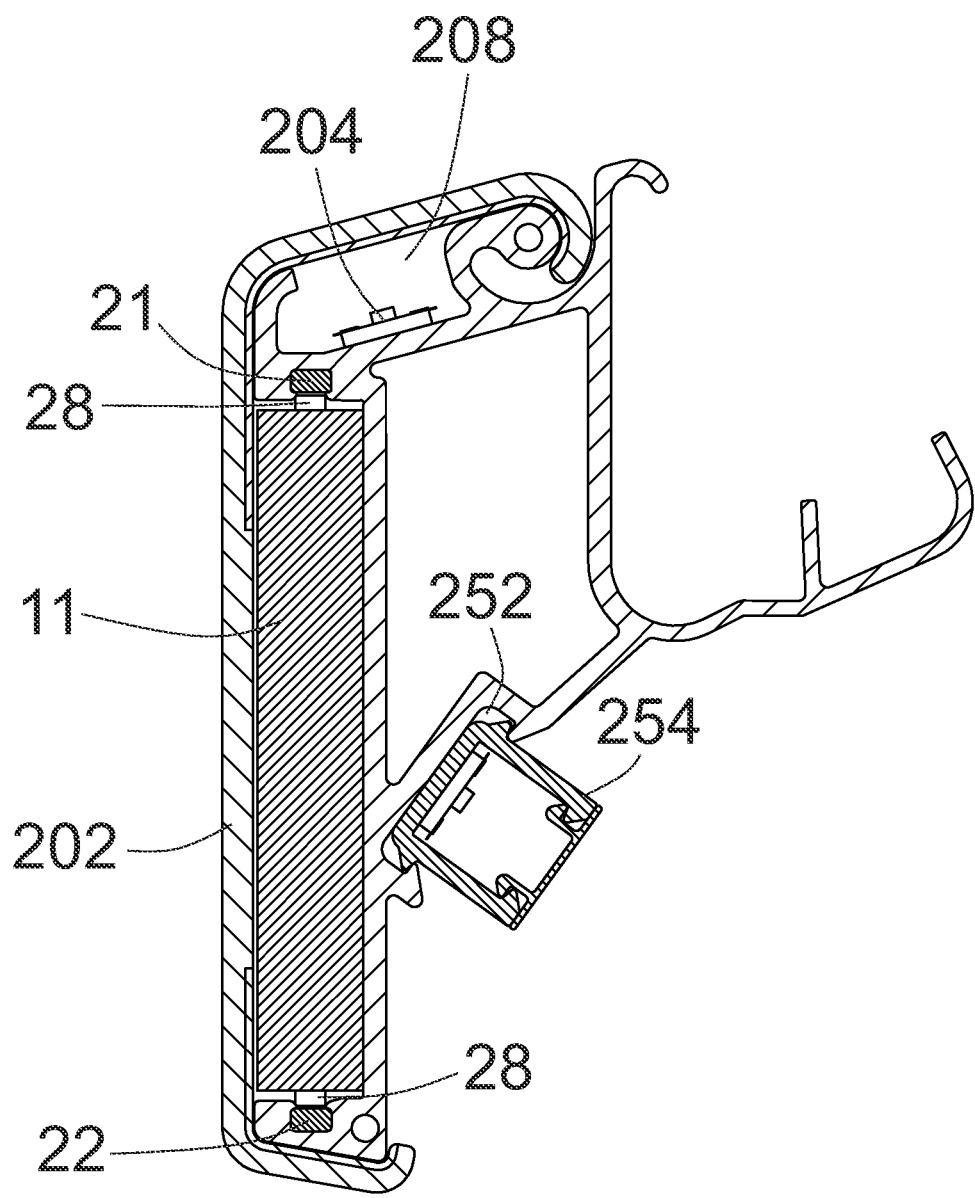
Figure 8:
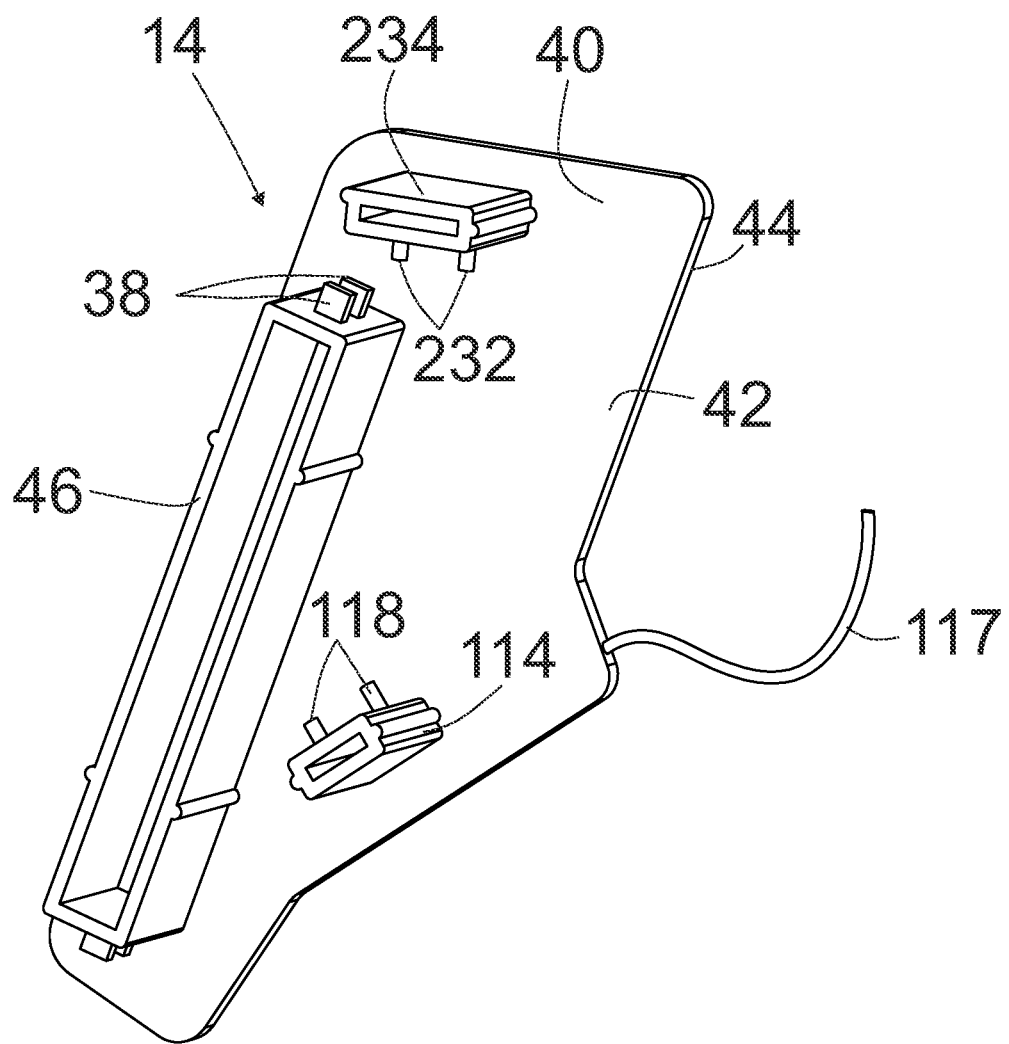
Figure 9A:
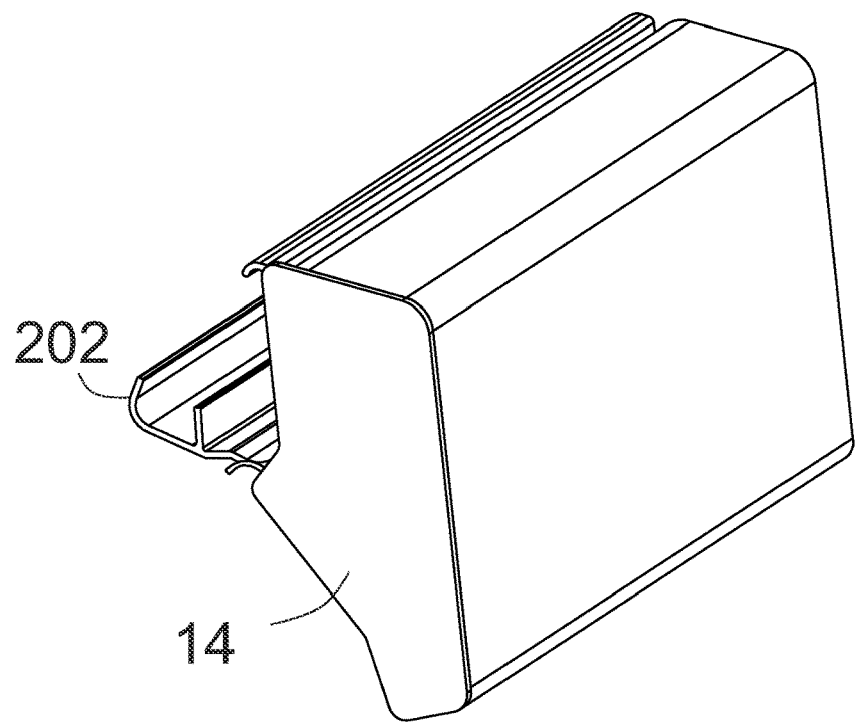
Figure 9B:
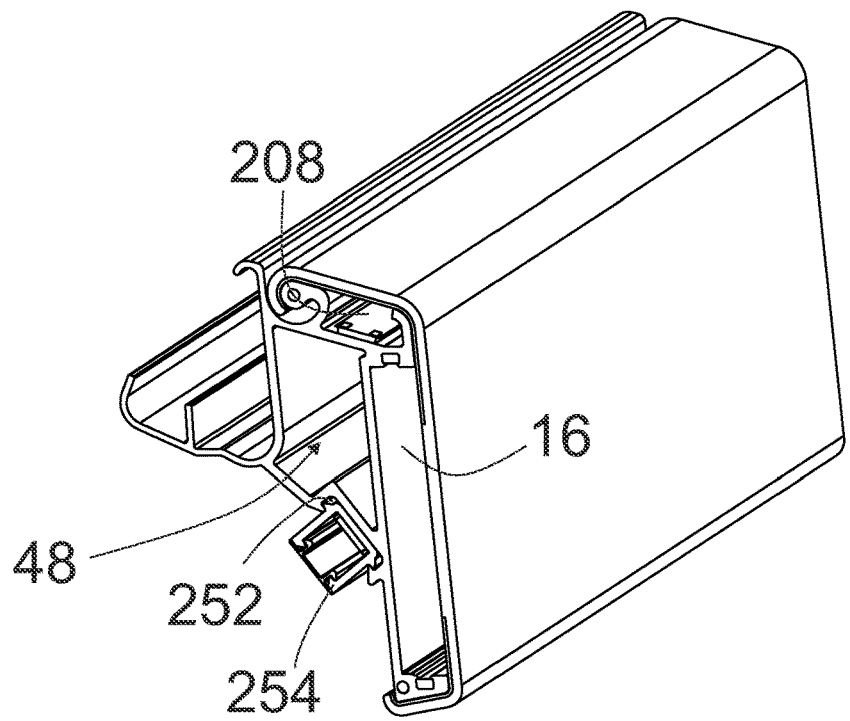

Embodiments of the invention are explained in more detail with reference to the accompanying drawings. The drawing shows FIG. 1 is a schematic representation of a first embodiment of a device according to the invention and a first embodiment of a system according to the invention together with a shelving device, FIG. 2 is a schematic representation of the device and system according to FIG. 1 in which the closure means is connected to the device, FIG. 3 is a schematic representation of a second embodiment of a system according to the invention, FIG. 4 is a schematic representation of a first embodiment of a product display system according to the invention, FIG. 5 is a schematic representation of a second embodiment of a product display system according to the invention, FIG. 6 is a sectional representation of a device of a third embodiment of a system according to the invention, FIG. 7 is the representation according to FIG. 6 with a display device, FIG. 8 is a three-dimensional representation of a closure means of the third embodiment of the system, FIG. 9A is a three-dimensional representation of the device according to FIG. 6 together with a closure means according to FIG. 8 connected to the base body, and FIG. 9B is the base body according to FIG. 9A without closure means.

The device 200 according to FIG. 1 comprises an elongate extruded base body 202 made of a plastic material for attachment to a shelving device 70 of a goods shelf 236 and a plurality of signaling devices 204 attached to the base body 202, of which only one is shown for the sake of clarity.

The base body 202 has a channel 208 extending over the entire length of the base body 202. The signaling device 204 is arranged or arranged successively in the channel 208 to form a row extending along the longitudinal axis 15 of the base body 202 in the channel 208.

Each of the signaling devices 204 is provided or configured for signaling a hand movement of a human hand 242 approaching the shelving device 70 and/or for signaling a hand movement of a human hand 242 moving away from the shelving device 70.

Each of the signaling devices 204 is designed in the form of a motion detector having a PIR sensor, wherein the three-dimensional detection range 244 that can be detected or generated by each motion detector 204 (see also dotted lines) is also shown schematically. The respective hand movement must take place in this detection range 244 so that the respective signaling device 204 can signal the respective hand movement, namely when the device 200, as shown here, is attached to the shelving device 70 or connected thereto (and namely here by only very schematically illustrated retaining elements 246, which are receivable or received for retaining or attaching to the shelving device 70 in receptacles of the shelving device 70). The detection range 244 is thus located in the spatial area in which a human hand 242 moves to grasp or remove a product 74 shelved on the shelving device 70 and in which the human hand 242 moves away from the shelving device 70, for example, after a removal of product.

In the connection situation illustrated in FIG. 1, the device 200 and the shelving device 70 also form a component 248 for a goods shelf 236 comprising the device 200 and the shelving device 70, wherein the device 220 is attached to the shelving device 70 or connected thereto.

FIG. 1 also illustrates a system 10 according to the present invention having the device 200 and closure means 14, wherein the base body 202 of the device 200 has two opposite end sections 212, wherein each of the end sections 212 has one of two opposite channel end sections 214 of the channel 208.

The system 10 further has two conductors 216, 218 for the power supply of each of the signaling devices 204 via a parallel connection. For this purpose, each signaling device 204 has two power supply contacts 250 and for this purpose, in each case, one of the conductors 216, 218 is electrically conductively connected to one of the power supply contacts 250.

Each of the conductors 216, 218 has two conductor end sections 220, 222 and an intermediate section 224. The intermediate section 224 of each conductor 216, 218 is arranged in the channel 208, and from each conductor 216, 218, one of the conductor end sections 220, 222 is arranged in each one of the two opposite channel end sections 214. Thus, for example, in the conductor 216, the conductor end section 220 is arranged in one of the two channel end sections 214, and the conductor end section 222 is arranged in the other of the two channel end sections 214.

The closure means 14 of the system 10 has two electrical supply lines 228, 230 which are provided to establish a connection to a current source 36 (see FIG. 2). The closure means 14 is connectable to each of the two opposite end sections 212 of the base body 202.

By connecting the closure means 14 to the end section 212 of the base body 202, a supply line end section 232 of each of the supply lines 228, 230 is electrically conductively contactable to a respective conductor end section 220, 222 of the conductor end sections 220, 222 which are arranged in the channel end section 214 of the end section 212 of the base body 202.

FIG. 2 illustrates the state in which the closure means 14 is connected to the rear end section 212, wherein the contacting of the supply line end sections 232 with the conductor end sections 220 in this embodiment in each case is made by contacting the supply line end sections 232 with the end faces of the respective conductor end section 220.

In order to realize a frictional connection of the closure means 14 with the respective base body end section 212, the closure means 14 has two insertion pins 17 which can be inserted in receptacles (not shown) which are provided on the end sections 212 of the base body 12 (not shown).

In the system 10 according to FIG. 3, the elongate extruded base body 202 of the device 200 has a further channel 16 or second channel 16, wherein in the further channel, a plurality of electronic display devices 11 for displaying product-related information are receivable (in FIG. 3 only one is illustrated schematically), and wherein the further channel 16 extends over the entire length of the base body 202, wherein each of the end sections 212 of the base body 202 has one of two opposite channel end sections 20 of the further channel 16.

The display devices 11 are receivable in the further channel 16. The system according to FIG. 3 furthermore has at least two conductors 21, 22 for the power supply of the display devices 11.

The display devices 11 are in the channel 16, which is open or accessible to both end faces and to a longitudinal side, successively received in the channel 16 along the longitudinal axis 15 of the base body 202 or receivable or successively receivable forming a row in the channel 16 extending along the longitudinal axis 15 of the base body 202. The display devices 11 can be frictionally received in the channel 16 from the longitudinal side or the display devices 11 are receivable by clamping from the longitudinal side in the channel 16.

Each of the conductors 21, 21 for the power supply of the display devices 11 has two conductor end sections 24, 26 and an intermediate section 29. The intermediate section 29 of each conductor 21, 22 is arranged in the further channel 16 and from each conductor 21, 22, each of the conductor end sections 24, 26 is arranged in each case in one of the two opposite channel end sections 20 of the further channel 16.

By receiving the display devices 11 in the further channel 16, each power supply contact 28 of each display device 11 can be electrically conductively connected to one of the conductors 21, 22.

The closure means 14 of the system 10 according to FIG. 3 has two further electrical supply lines 32, 34 which are provided for connection to a current source. By connecting the closure means 14 to each of the end sections 212 of the base body 202, each supply line end section 38 of each of the further supply lines 32, 34 is also electrically conductively contactable with each conductor end section 24, 26 of the conductor end sections 24, 26, which are arranged in the channel end section 20 of the respective base body end section 212.

The current conductors 21, 22, 216 and 218 are arranged in the above embodiments in the channel 208 or the further channel 16 or are arranged completely or wholly. Each conductor 21, 22, 216 and 218 is designed in the form of a rectilinear conductor track 21, 22, 216 and 218. Each conductor track 21, 22, 216 and 218 is extruded onto the base body 12.

The conductors 21, 22, 216 and 218 have the conductor end sections 24, 26, 220 and 222 and the intermediate sections 29 and 224, wherein the respective conductor end sections are connected to each other by the respective intermediate section. The respective intermediate section is arranged in the respective channel and the conductor end sections are arranged in the respective channel end section or arranged completely or wholly. However, according to the invention, of course, a restriction to an arrangement or a complete arrangement of the conductor end sections in the respective channel end section is not provided. Thus, in an alternative embodiment, at least one of the conductor end sections can also be arranged, for example, with a subsection 31 outside the respective channel and be arranged with a subsection 27, 226 in the respective channel end section 20, as illustrated schematically in FIGS. 1 and 3.

The base body 202 according to FIG. 6 of a third embodiment of a system 10 according to the invention differs from the base body 202 according to FIG. 3 essentially in that the further or second channel 16 of the extruded base body 202 comprises three contiguous subregions 97, 98 and 99, which are designed rectangular in cross-section. A respective conductor 21, 22 for the power supply of the display devices is arranged in the respective smaller subregions 98, 99. In the sectional view according to FIG. 7, the electrically conductive contacting of the conductors 21, 22 is illustrated with the power supply contacts 28 of a display device 11 which is received in the further channel 16. Furthermore, according to FIGS. 6 and 7, the base body 202 has a first channel 208, in which a plurality of signaling devices 204 are successively arranged in a row in the longitudinal direction of the base body 202. A long lamp 254 is attached and arranged for illuminating adjacent shelving devices in a third channel 252. The channels 208 and 252 are each formed open towards a longitudinal side of the base body 202. The base body 202 is designed attachable to a shelving device of a product presentation system over the claw-type region 108. The system 10 according to FIGS. 6 and 7 further have an extruded covering element 109 for covering the channels 16, 208 and 252. The covering element comprises a transparent partial region 256 and two opaque partial regions 258.

The closure means 14 (see FIG. 8) of the system having the base body 202 according to FIGS. 7 and 8 has a flat body 40 made of a plastic material with two opposite sides 42 and 44 and an insertion body 46 made of a plastic material connected to the side 42. The insertion body 46 is for connecting the closure means 14 to an end section 212 of the base body 202 by end-face insertion into the further channel 16 in the channel 16 in a frictionally receivable manner—see also FIG. 9A. The supply line end sections 38 contactable with the respective conductor end sections of the further channel 16 are provided on the insertion body 46, wherein in this embodiment, both the upper and lower supply line end sections 38 are each designed in the form of a double contact.

The closure means 14 according to FIG. 8 further has a second and a third insertion body 234, 114. The second insertion body 234 has two supply line end sections 232 in the form of contacting elements 232 for the power supply of the signaling devices 204, which are contactable by inserting the insertion body 112 into the channel 208 with the corresponding conductor end sections. The contacting elements 232 themselves are each in turn electrically connected to a respective line, which is received in sections in a sheath of a cable 117, in which the supply lines for the power supply of the display devices and the long lamp 254 are also received in sections. The same also applies to the third insertion body 114. The third insertion body 114 has two connection elements 118 for the power supply of the long lamp 254, which are contactable with (not shown) supply lines of the long lamp 254, which are arranged in the channel 252 by inserting the insertion body 114 into the channel 252. The connection elements 118 themselves are each in turn electrically connected to a respective line, which is received in sections in the sheath of the cable 117. All lines received in sections in the sheathing of the cable 117 can be energized in a product presentation system according to the invention via connection elements provided respectively on at least one retaining element by receiving the retaining element in the respective receptacle of the retaining post, and namely to supply power to the display devices 11, the signaling devices 204 and the long lamp 254.

The end face 48 of the base body 202 (see FIGS. 9A and 9B) is visually very appealing through end-face insertion of the insertion body 46 and the insertion body 112 and 114 is coverable in the channels 16, 204 and 252 of the flat body 40 of the closure means 14.

The product presentation system 66 according to FIG. 4 comprises a system 10 according to the invention and a goods shelf 236 with two retaining posts 68 and a shelving device 70, wherein of course a higher number of retaining posts and shelving devices can also be provided in alternative embodiments.

The shelving device 70 has a shelf element 72 for shelving products 74 and two retaining elements 76.

The retaining elements 76 are detachably connected to the shelf element 72, namely by not shown receptacles on the shelf element 72, in which tabs, not shown, of the retaining elements 76 are insertable.

Each retaining post 68 has four receptacles 78, wherein in each of the receptacles 78, each one of the retaining elements 76 for retaining the shelving device 70 is receivable on the retaining post 68. FIG. 5 already illustrates the state in which the retaining elements 76 are received in each of two opposite receptacles 78, wherein a receptacle 78 is located on the one retaining post 68 and the other receptacles 78 on the other retaining post 68.

One of the two retaining posts 68 has two electrical conductors 80, which are provided for connection to a current source 82.

One of the retaining elements 76 has two electrical connection elements 84, wherein each one of the supply lines 228 or 230 of the closure means 14 is electrically connectable to each connection element 84.

Each connection element 84 is electrically conductively contactable by receiving the retaining element 76 in the respective receptacle 78 of the retaining post 68 with each of the conductors 80 of the retaining post 68.

The elongate base body 202 of the system 10 or the device 200 is attachable to the shelving device 70, wherein FIG. 4 already illustrates the attached state. The shelf element 72 is formed elongated and the elongate base body 202 is attachable to the shelving device 70 in an arrangement in which a surface 90 of the body 202 extending along the longitudinal axis 86 of the base body 202 faces a surface 91 of the shelf element 72 extending along the longitudinal axis 88 of the shelf element 72.

The product presentation system 66 according to FIG. 5 differs from the product presentation system 66 according to FIG. 5 in that the retaining post 68 additionally has a data line 92 provided for connection to a data source 94. The retaining element 76 with the electrical connection elements 84 additionally has a data line connection 96, wherein a data supply line 60 of a closure means 14 of a device 200 is connectable to the data line connection 96. The data line connection 96 is connectable in a data-transferable manner by receiving the retaining element 76 in the receptacle 78 of the retaining post 68 with the data line 92 of the retaining post 68. The data supply line 60 is in turn a data supply line 60 of a further embodiment of a closure means 14 which, by connecting to an end section 202 of the device 200, also establishes a data-transferable connection with at least one data line arranged at least in sections in the channel 208 of the device 200, which data line is provided for the forwarding of the digital signals output from the signaling devices 204 for the hand movement signaling. The digital signals can then be transmitted to the data source 94 via the data supply line 60.

LIST OF REFERENCE CHARACTERS 10 system
11 display device
14 closure means
15 longitudinal axis
16 further channel
17 insert pin
20 channel end section
21 conductor
22 conductor
24 conductor end section
26 conductor end section
27 subsection
28 power supply contact
29 intermediate section
31 subsection
32 supply line
34 supply line
36 current source
38 supply line end section
40 flat body
42 side
44 side
46 insertion body
48 face side
60 data supply line
66 product presentation system
68 retaining post
70 shelving device
72 shelf element
74 product
76 retaining element
78 receptacle
80 conductor
82 current source
84 connection element
86 longitudinal axis base body
88 longitudinal axis shelf element
90 surface
91 surface
92 data line retaining post
94 data source
96 data line connection
97 subregion
98 subregion
99 subregion
108 claw-like region
109 covering element
114 insertion body
117 cable
118 connection element
200 device
202 base body
204 signaling device
208 channel
212 end section
214 channel end section
216 conductor
218 conductor
220 conductor end section
222 conductor end section
224 intermediate section
226 subsection
228 supply line
230 supply line
232 supply line end section
234 insertion body
236 goods shelf
242 human hand
244 detection range
246 retaining element
248 component
250 power supply contact
252 third channel

254 long lamp
256 subregion
258 opaque subregion

The invention claimed is:

1. A device, comprising:
an elongate base body being made of a plastic material for attachment to a shelving device of a goods shelf, the base body including a channel and a pair of opposite end sections positioned at opposing ends of the base body;
at least two conductors extending along the channel between the opposite end sections; and
at least one signaling device being arranged within the channel of the base body for signaling a hand movement approaching the shelving device or for signaling a hand movement moving away from the shelving device, the at least one signaling device being connectable to the at least two conductors for receiving a power supply therefrom, wherein a position of the at least one signalling device within the channel of the base body is adjustable.

2. A component for a goods shelf, comprising:
a device according to claim 1; and
a shelving device;
wherein the device is attached to the shelving device.

3. A system having a device according to claim 1 and at least one closure means, wherein each of the end sections has one of two opposite channel end sections of the channel, wherein each of the conductors has two conductor end sections and an intermediate section, wherein the intermediate section of each conductor is arranged in the channel and from each conductor each of the conductor end sections is arranged in one of the two opposite channel end sections with at least one subsection, wherein the closure means has at least two electrical supply lines which are provided for establishing a connection to a current source, wherein the closure means is connectable to at least one of the two opposite end sections of the base body, wherein by connecting the closure means to the end section of the base body, each supply line end section of each of the supply lines is electrically conductively contactable with each conductor end section of the conductor end sections, which are arranged in the channel end section of the end section of the base body with at least one subsection.

* * * * *